United States Patent

Cronin

[15] 3,644,230

[45] Feb. 22, 1972

[54] EXTRUSION PROCESS FOR POLYOLEFIN FOAM

[72] Inventor: Edward W. Cronin, Wilmington, Del.
[73] Assignee: Haskon, Inc., New Castle, Del.
[22] Filed: Feb. 19, 1968
[21] Appl. No.: 706,661

[52] U.S. Cl. .....................260/2.5 E, 117/128.4, 260/23 H, 260/31.2 R, 260/33.4 PQ, 260/33.6 PQ, 260/33.8 UA, 260/88.2 S, 260/93.7, 260/94.9 GD, 264/53
[51] Int. Cl. ...................C08f 47/10, C08f 3/04, B29d 27/00
[58] Field of Search..................................260/2.5 E; 264/53

[56] References Cited

UNITED STATES PATENTS

| | | | |
|---|---|---|---|
| 3,067,147 | 12/1962 | Rubens et al. | 264/53 |
| 3,461,088 | 8/1969 | Stahnecker et al. | 264/53 |
| 3,222,304 | 12/1965 | Ingram | 260/2.5 |

Primary Examiner—Samuel H. Blech
Assistant Examiner—Wilbert J. Briggs, Sr.
Attorney—Eleanor R. Bartholomew

[57] ABSTRACT

Post extrusion cell collapse in polyolefin foams is prevented by the incorporation of a small amount of a partial ester of a long chain fatty acid and a polyol.

4 Claims, No Drawings

EXTRUSION PROCESS FOR POLYOLEFIN FOAM

This invention relates to an improved process for the extrusion of polyolefin foams and to the foams produced thereby.

Small celled polyolefin foams are lightweight, low-density materials which have many attractive commercial uses. In the past, most of this material has been prepared by compression molding or other techniques wherein foaming takes place within a confined volume, as in a shaping die. More recently the art has been moving in the direction of forming such foamed structures by extrusion since there are well known economic advantages to be realized from extrusion processes.

In the typical foam extrusion process, the polymer, with mixing aids, stabilizers and other additives, is melted in the melting section of an extruder and an inert, low-boiling hydrocarbon foaming or blowing agent is added thru the extruder barrel, under pressure, to the molten polymer. When the polymer is subsequently extruded, the decrease in pressure on the molten polymer causes the liquid to vaporize and expand, with resultant cell formation in the polymer.

Preparation of foam by extrusion, however, is a sensitive process since, with usually no provision for confining the foam, there is a tendency for the liquid blowing agent simply to boil away, passing out through the molten polymer. As a result, the foam collapses, either completely or partially and increases in density to an undesirable level.

Now, in accordance with this invention, it has been found that cell collapse in extruded polyolefin foam can be substantially reduced or eliminated if there is added to the polymer to be extruded 0.1 to 10 percent by weight, preferably 0.1 to 3 percent by weight based on polymer weight, of a partial ester of a fatty acid of about 12 to 18 carbon atoms and a polyol having three to six hydroxyl groups. The invention, then, is the improvement in the extrusion process for preparing polyolefin foams using low boiling hydrocarbon blowing agents which comprises extruding a hydrocarbon polymer having incorporated therein, in addition to the aforesaid hydrocarbon, 0.1 to 10 percent, preferably 0.1 to 3 percent based on the weight of the polymer, of a partial ester of a fatty acid of about 12 to 18 carbon atoms and a polyol having three to six hydroxyl groups.

The process of the invention is applicable to preparation of foams of any hydrocarbon polymer which can otherwise be employed in foaming processes. This includes, e.g., high-density polyethylene, low-density polyethylene, stereoregular polypropylene, and a copolymers of ethylene or propylene with other $\alpha$-olefins. Mixtures of the above can also be used. By high density polyethylene is meant the highly crystalline, essentially straight chain polymer which has a density of about 0.945 and higher. Low-density polyethylene is the branched chain polymer having density less than about 0.945, prepared by e.g., the peroxide catalyzed, high pressure process. Polyolefin foams having extremely low bulk density, e.g., less than 10 pounds per cubic foot and preferably less than 8 lb. per cubic foot can readily be prepared using the process of this invention. The copolymers of ethylene or propylene can be either the crystalline or amorphous types.

The partial esters of fatty acids which are used to prevent cell collapse of extruded polyolefin foams according to this invention are members of a generic class known as surface active agents or surfactants. Exemplary surfactants in the class of useful additives include, for example, glyceryl monostearate, glyceryl distearate, mixtures of these mono- and diglycerides, sorbitan mono-, di-, and trioleates, and mono- and diglycerides of oleic acid and palmitic acid, inter alia.

The reasons for the efficacy of the partial esters of the specified polyols in stabilizing foams is now known for certain. However, it has been postulated that there is a relationship between the solubility of the surfactant in hydrocarbons and the ability to prevent foam collapse. It has been suggested that the surfactant must be of low solubility at low temperatures in order to perform in the process of this invention. This is not, however, intended as a limiting theory.

The blowing agent which is employed in the process of this invention can be any hydrocarbon including halogenated hydrocarbons which boils below the melting point of the hydrocarbon polymer. This includes such compounds as pentane, hexane, heptane and octane. Halogenated hydrocarbons which meet the same limitations as to boiling point and which can be used include e.g., methylene chloride, dichlorodifluoromethane, dichloroethane, chlorodifluorethane, tetrafluoroethane, and similar halogenated hydrocarbons. Mixtures of these materials are also useful.

In addition to the specified surfactant and blowing agent, the foamable composition will also usually contain small amounts of a metallic soap such as zinc stearate and a finely divided inorganic material such as calcium silicate as lubricants and cell nucleating agents. These materials are used in small amounts, e.g., a combined total of about 0.2 to 2 percent by weight based on polymer weight. It is found that their presence contributes to the attainment of uniform small cell size in most cases.

By small cell foam, it is intended to indicate a foam having cells of about 2 millimeters or less average diameter. Cells of this small diameter are preferred since this type of foam is usually more resilient than one having larger cells. Additionally, smaller cells lead to smoother skin on the foam.

The extrusion of the foam is effected in any known way by means of either single or multiple screw extruders. Equipment of this type is standard and commercially available, and forms no part of this invention.

The improved process of this invention is applicable to the production of foamed articles of any shape which can conveniently be formed by extrusion, for example sheets, rods, tubes, and wire or cable coatings. The resulting closed-cell foam structures are characterized by good thermal insulation properties, lightweight, and compressibility.

In addition to the blowing agent, the hydrocarbon polymer employed in this invention can, and usually will, contain other additives for other purposes. For example, hydrocarbon polymers usually contain a small amount of a heat or light stabilizer and an antioxidant to prevent degradation during processing. Pigments, plasticizers, nucleating agents, and mixing aids are also frequently employed. The process is operable with any of such aids in the customary quantities.

EXAMPLE 1

A foamable composition was prepared containing 100 parts of low-density polyethylene having a melt index of 1.9, 0.25 part zinc stearate, 0.2 part calcium silicate and 0.2 part of a mixture of a minor portion of glycerol mono- and a major portion of distearate sold commercially under trade name Atmos 150. This mixture was extruded thru a 2½ inch single screw extruder fitted with a round hole die. Temperature was controlled across the extruder in five zones and the die, as follows: first zone 154° C., second zone 154° C., third zone 118° C., fourth zone 118° C., fifth zone 113° C.; and at the die 110° C. Between the first and second zones, there was introduced a mixture of 3.5 parts of hexane and 7 parts of dichlorodifluoromethane under pressure of 2,850 p.s.i.

On emerging from the die, the composition immediately expanded to a foamed rod about 0.87 inch in diameter. After cooling, this had shrunk to 0.75 inch and after 48 hours, was still 0.75 inch. The density of this foam was about 5 pounds per cubic foot.

When a control for the above test was run, omitting the glycerol mono- and distearate mixture, the foam initially expanded to the same diameter, but upon cooling it shrunk to 0.65 inch and after 48 hours, it had further shrunk to about 0.50 inch. The density measured after 48 hours was about 11.3 pounds per cubic foot.

EXAMPLE 2

A composition similar to that of Example 1 was prepared containing 0.12 part of glycerol monostearate in place of the mixed glycerides of Example 1. This mixture was extruded using a mixture of 3.5 parts hexane and 7 parts dichlorodifluoromethane. The extruder in this instance was staged as follows: 157° C., 157° C., 127° C., 123° C., 123° C., and 111° C.

The resulting foamed rod had initial diameter of 0.85 inch, 0.80 after cooling and 0.80 after cooling and 0.80 after 48 hours. Its density was about 5 pounds per cubic foot.

EXAMPLE 3

Another foamable composition was prepared wherein the fatty acid ester was sorbitan monostearate. This was extruded through the same extruder and die having the following temperature zones: 154° C., 159° C., 138° C., 124° C., 124° C., and 110° C. at the die. Foamed rod produced from this formulation had initial diameter of 0.87 inch, 0.70 after cooling, and 0.70 after 48 hours. Its density was 5.8 pounds cubic foot.

EXAMPLE 4

The foamable composition in this example was comprised of 100 parts of high-density polyethylene, 0.4 part of the mixed glycerol di- and monostearate, 0.2 part zinc stearate and 0.2 part calcium silicate. This was fed thru the same extruder where the hexane-dichlorodifluoromethane mixture was added. The extruder was temperature staged as followers: 182° C., 188° C., 185° C., 185° C., 143° C., and at the die 110° C. The resulting foamed rod had initial diameter of 0.90, after cooling 0.87, and after 48 hours 0.97. Its density was 3.5 pounds per cubic foot.

EXAMPLE 5

The foamable composition in this example was:

| | |
|---|---|
| stereoregular polypropylene | 100 parts |
| mixed glycerol stearates | 0.2 part |
| calcium silicate | 0.2 part |

This mixture was extruded thru the same extruder and die combination using the same foaming agent. The temperature staging was as follows: 188° C., 199° C., 190° C., 177° C., 140° C., and 168° C. at the die. The foamed rod was 0.95 inch on emergence from the die, 0.94 inch on cooling and 0.94 inch after 48 hours. Its density was 1.7 pounds per cubic foot.

When the same test was performed, omitting the mixed glycerides, the initial diameter of the rod was the same, but on cooling it collapsed to 0.61 inch and its density was 2.7 pounds per cubic foot.

EXAMPLE 6

A foamable composition was prepared containing 100 parts of low-density polyethylene, 0.4 part of mixed glycerol mono- and distearate, 0.25 part zinc stearate and 0.4 part calcium silicate. This was extruded thru a 4½ single screw extruder thru a sheet forming die using as the foaming agent a mixture of 7 parts dichlorodifluoromethane and 3.5 parts hexane. The resulting flat foamed sheet was 0.25 inch thick on emergence, 0.241 after cooling and 0.238 after 48 hours. Its density was 6.0 pounds per cubic foot.

When the mixed glycerides were omitted, the initial thickness was 0.25 inch, but it collapsed to 0.200 on cooling, and 0.170 after 48 hours. Its density was 8.5 pounds cubic foot.

What I claim and desire to protect by Letters Patent is:

1. An extrusion process comprising: admixing in the extruder an olefin polymer, a low-boiling blowing agent selected from the group consisting of (a) hydrocarbons, (b) halogenated hydrocarbons, and (c) mixtures of (a) and (b), a nucleating agent comprising a finely divided inorganic material, 0.1 to 10 percent based on the weight of the polymer, of a partial ester of a fatty acid having 12 to 18 carbon atoms and a polyol having three to six hydroxyl groups, and extruding a foam of olefin polymer which has a density of no greater than 10 pounds per cubic foot.

2. The process of claim 1 where the olefin polymer is selected from the class consisting of low-density polyethylene, high density polyethylene, stereoregular polypropylene, copolymers of ethylene and proplyene and mixtures of these polymers.

3. The process of claim 2 where the partial ester is a mixture of glycerol monostearate and glycerol distearate.

4. The process of claim 1 where the density of the extruded foam is no greater than about 8 pounds per cubic foot.

* * * * *